United States Patent Office 2,879,786
Patented Mar. 31, 1959

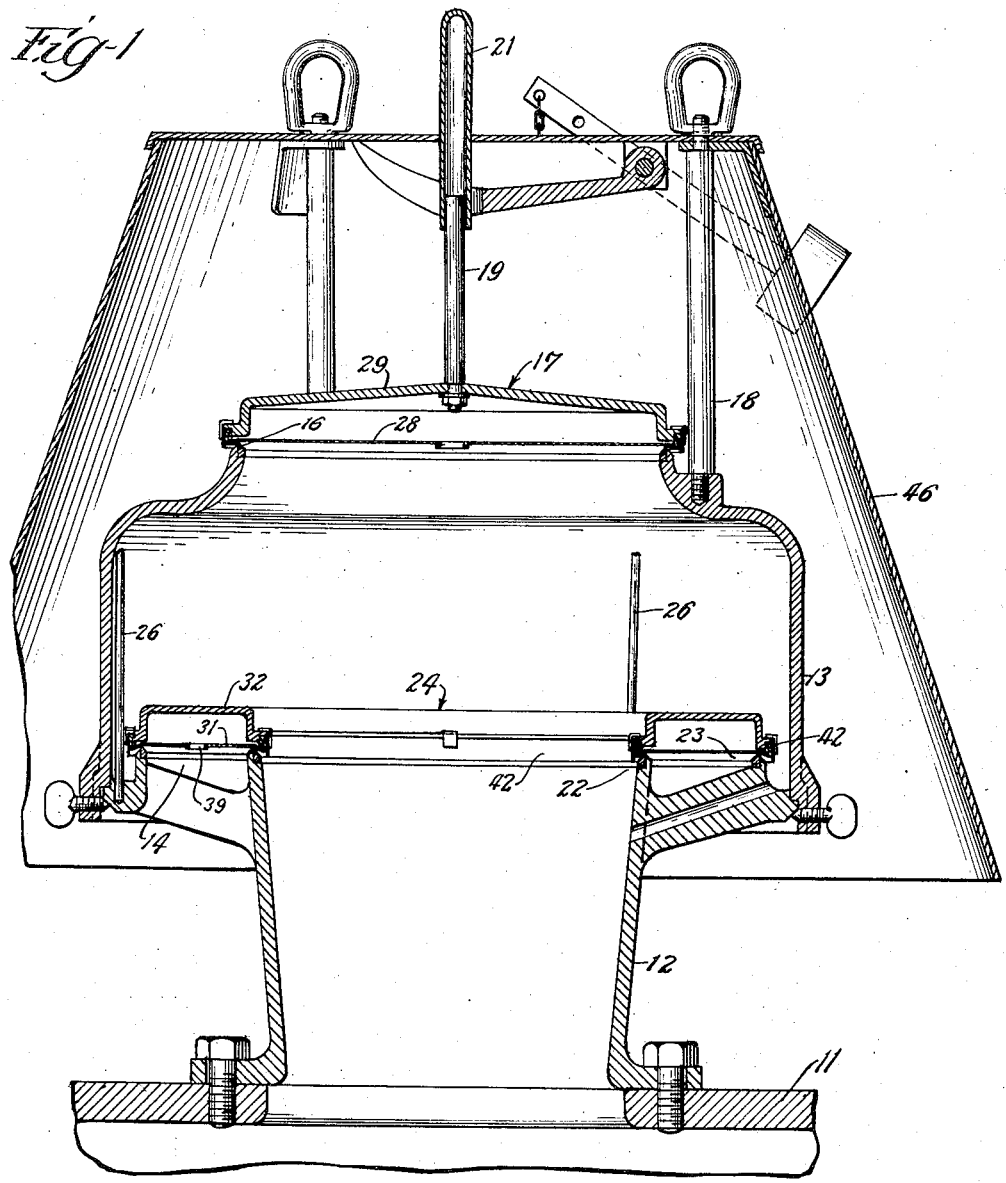

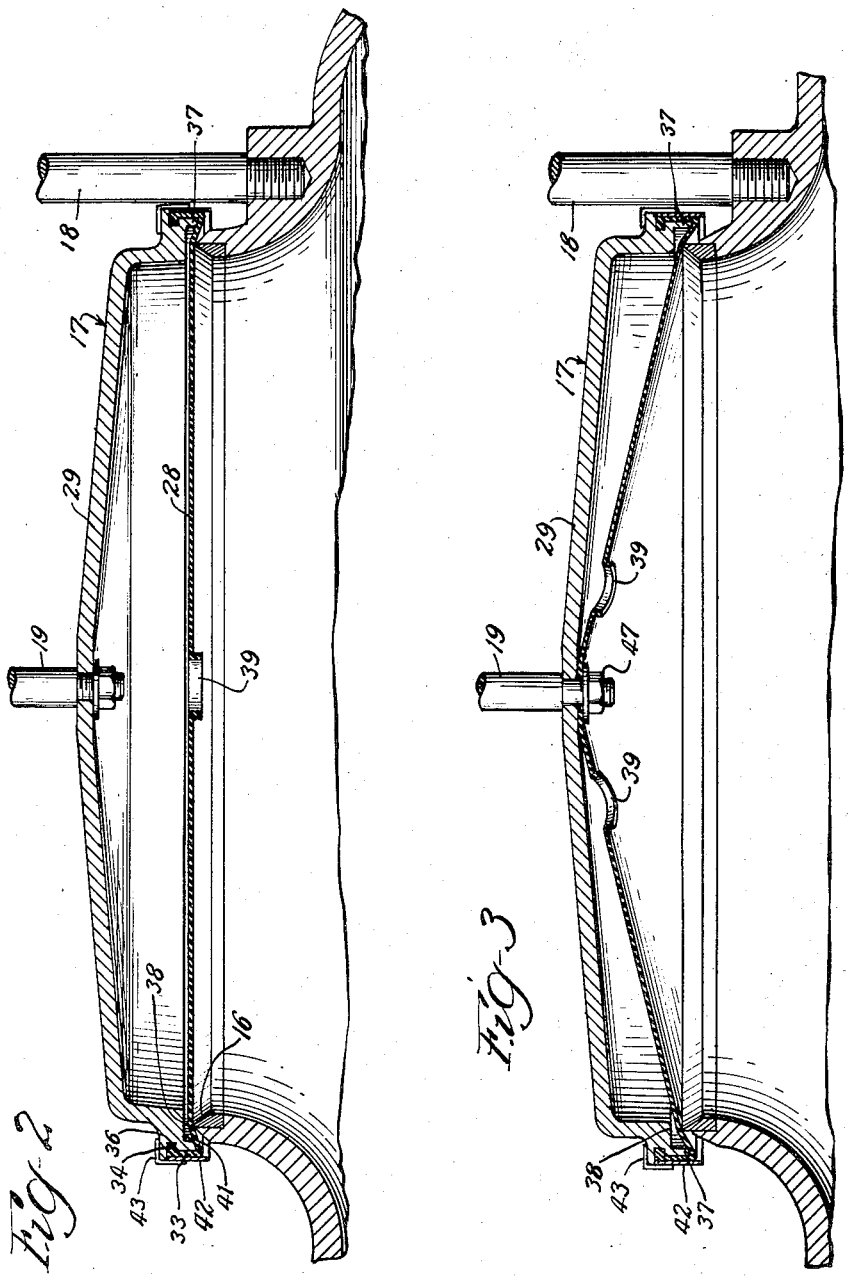

2,879,786

DIAPHRAGM-TYPE RELIEF VALVE

Irvin La Delle Heideman, Oak Park, Ill., assignor to The Johnston & Jennings Co., Chicago, Ill., a corporation of Ohio Application August 14, 1953, Serial No. 374,343

7 Claims. (Cl. 137—329.06)

In the storage of volatile fuels, such as gasoline, in large tanks, adequate relief valves are very important. The pressure of the vapors above the liquid must not be very much higher than or lower than the surrounding atmospheric pressure. It is not economical to make such large tank structures capable of standing a very high differential of pressure. The valve must be large enough to give fast enough relief for safety. Whenever the pressure differential begins to exceed the safe limit, relief valves must open to let vapor flow out or to let air flow in until the pressure differential is again safe.

It is highly desirable to restrict such venting to the minimum which is necessary for safety. The escape of the fuel vapor for relief purposes is obviously wasteful. Accordingly, it is highly desirable that the relief valves be perfectly sealed except when safety conditions require the valves to open. In the past, considerable effort has been devoted toward providing dependable sealing of such valves. The sealing problem is made difficult by virtue of the fact that the valves must be of fairly large size, so that there can be adequate flow of vapor or air through them when necessary. On the other hand, the sealing pressure, the force seating the valve, is extremely low. In fact, as the differential approaches the safe maximum, the sealing pressure approaches zero, because the differential pressure is almost enough to open the valve. This inherent characteristic has the disadvantage that the sealing pressure is least when the differential pressure to be sealed is greatest.

Sometimes the seal has comprised a metal cap seating against a valve seat of annular form also of metal. In an effort to obtain good sealing, both are ground carefully so that the entire circumference of the seat lies in a plane, and the entire circumference of the ground surface designed to seat against the seat also lies in a plane. Theoretically, this should produce good sealing, but in practice the seal is too often woefully inadequate. The failure may be due to warpage with temperature changes, due to erosion or corrosion. Even without these, perfect grinding is impossible and nearly perfect grinding is expensive. Resilient sealing rings have been tried, but with such slight sealing pressure available they are quite likely to prove inadequate. Exact uniformity in such resilient members is difficult to attain, and sometimes it seems that the resilient member creates more irregularity than its resiliency will compensate for, with the result that sealing can be even worse with the resilient member than without it.

According to the present invention, amazingly good sealing results have been attained by using a diaphragm in the nature of rubber-like sheet material secured along its edge or edges to the cap, but spaced from the cap along the line of the seal with the seat, so that the diaphragm is not at any point squeezed between the cap and the seat, but is free to accommodate itself by slight stretching to the minute irregularities of the seat.

Additional objects and advantages of the invention will be apparent from the following description and from the drawings.

Designation of figures

Fig. 1 is a slightly fragmentary vertical sectional view taken through a twin valve unit, embodying two forms of the present invention, the two forms being similar except that one is for a pressure relief valve and the other is for a vacuum relief valve.

Fig. 2 is a view showing the pressure relief valve of Fig. 1 on an enlarged scale, again in vertical section.

Fig. 3 is a view similar to Fig. 2, but showing a modification in which the diaphragm is drawn upwardly to a conical shape.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

Typical valve structure

Although the diaphragm valve of the present invention may be used with a wide variety of valve structures, that shown in Fig. 1 is typical of tank relief valves, for which it is especially intended. The valve assembly is secured to a tank 11 by a valve base 12 which may be sealed to the tank 11 by a gasket or in any suitable manner. The base 12 is shaped to speed the flow of gas through it when the valves are open. The base 12 carries a shell 13 which is sealed to the base 12 outside of an annular vacuum relief opening 14. The shell 13 terminates in an annular pressure relief valve seat 16, against which seats a valve structure indicated generally by 17. The valve structure 17 is mounted so that it may move to and from the valve seat 16, the illustrated form permitting this movement by virtue of the fact that the valve structure 17 moves freely between guide pins 18, with further guidance from the central guide pin 19 which rides smoothly in a guiding sleeve 21.

The annular port 14 is formed between annular valve seats 22 and 23. This port is controlled by a movable valve structure 24, mounted similarly to the mounting of valve structure 17, in the illustrated form, riding freely between guide pins 26.

Novel structure

It will be observed that with both of the movable structures 17 and 24, the actual sealing is done by a diaphragm. Thus, in movable structure 17, a diaphragm 28 is carried by a cap 29. In movable valve structure 24, a diaphragm 31 of annular shape is carried by an annular cap 32.

The details of the movable structure 17 are best seen in Fig. 2. Here it is seen that the diaphragm 28 may conveniently be formed with an upwardly extending flange 33, the upper end of which turns in at 34. The periphery of cap 29 is shaped with a groove 36 so that the diaphragm 28 may be stretched slightly to snap the flange 33, 34 around the cap 29 with the portion 34 extending into groove 36. This will hold the diaphragm on the cap 29.

The cap 29 is provided with an annular bead or rim 37, which holds the main body of the diaphragm 28 down clear of the cap 29. The diaphragm 28 is preferably under just enough tension so that it will, with the maximum sealing pressure available, assume a position approximately as illustrated, the portion of the diaphragm 28 engaging the annular seat 16, being still out of contact with the cap 29. It is preferred, however, that the cap 29 have a reserve sealing face 38 opposite the annular seat 16, so that in the event of complete failure of the diaphragm 28 the reserve sealing face 38 will seal against the valve seat 16. Ideally, the reserve sealing face 38 should be ground to ensure as good a seal under these conditions as with conventional valve structures. However, it is not expected that the diaphragms 28 will fail often enough to make this expense necessary.

One or more reinforced openings 39 is preferably provided through diaphragm 28, so that the pressure above the diaphragm 28 will be the same as that below the diaphragm 28 and within the tank. As the differential pressure between the inside of the tank and the atmosphere increases, the higher pressure in the annular zone 41 tends a little bit to wrap the diaphragm around the seat 16 slightly to improve the seal.

Complete certainty that the diaphragm will stay in place until intentionally removed is provided by rings 42. After the diaphragm has been snapped into place, a ring 42 is slipped up over it until it strikes an annular shoulder on cap 29. A plurality of ears 43 are then bent over the top of this portion of the cap 29 to hold the ring 42 in place. The ring 42 may be formed by overlapping the ends of a band and spot-welding them. The ears 43 may be the ends of pieces spot-welded on the outside of ring 42.

The diaphragm 31 is very similar to diaphragm 28 except that it is an annular diaphragm. It is secured to cap 32 in a manner very similar to the securing of diaphragm 28, having flange 33 and related parts along its inner periphery as well as along its outer periphery. Also a ring 42 is applied along its inner periphery as the ring 42 is applied along its outer periphery.

The bottom edges of the various rings 42 serve as drip rings. Of course the entire valve structure may be shielded from rain by an outer shell or cover 46, but it is nevertheless desirable to provide drip rings to ensure against the possibility of condensation moisture dripping on the valve seats and causing difficulties such as freezing.

Fig. 3 shows a modified arrangement of the diaphragm, in which it is drawn to a conical shape by virtue of having its central portion drawn up under a nut 47, by which pin 19 is secured to cap 29. One or more recessed openings 39 is provided at an off-center position. The caps 29 of Figs. 2 and 3 may be identical, although in Fig. 2 the downwardly extending lip or bead 37 does not need to be quite as deep as in Fig. 3.

Applicant prefers that for some purposes the diaphragm 28 be stretched to the conical shape shown in Fig. 3. Surprisingly, it results in faster flow of gasses under some conditions. This is especially true when the downwardly extending rim of ring 42 extends well below the adjacent part of the diaphragm. Under these conditions, the ring 42 and the diaphragm, especially when of conical shape, seem to hold the movable valve structure higher under some moderately excessive pressures, so that faster escape of the vapors causing these pressures results. For best results, it is preferred that the drip band extend about 3/16 of an inch beneath the adjacent portions of the diaphragm.

The diaphragm may be made of any soft, flexible, rubber-like material which is sufficiently resistant to the vapors of the stored material, usually gasoline. The petroleum-resistant "Neoprene" type of synthetic rubbers are at present believed to be highly satisfactory for this purpose.

It is deemed important that a large area of the diaphragm be of relatively unrestrained flexibility to facilitate the diaphragm's accommodating itself to any minute irregularities of the valve seat. From this standpoint, the form of diaphragm shown in Fig. 2, having no interference with the flexibility of the diaphragm throughout the entire area of the opening, is perhaps ideal. However, the form shown in Fig. 3 has also been found to be very satisfactory, the constrained portion of a diaphragm under nut 47 being very small. Of course, the constrained area could be a little larger than shown, but it is preferred that the unconstrained area extend from the rib 37 at least one-third of the way across the opening.

I claim:

1. A vent valve including a valve seat surrounding an opening, and a valve structure mounted for relative movement as a whole toward and from said seat for closing on said seat including a cup-shaped cap having the inner diameter of its rim of substantially greater diameter than the outer diameter of said seat, a diaphragm of rubber-like material supported by said cap in an elastically stretched condition over the rim of said cap to maintain the portion of the diaphragm engaging the valve seat free from contact with the remaining portion of said cap under the fluid pressure conditions encountered, whereby the diaphragm conforms to the seat, said diaphragm having an aperture therethrough to provide communication between said seat opening and the interior of said cap, the closing movement being arrested only by engagement of the free diaphragm portion on the valve seat; the cap being floatingly positioned in its closed position and moved to the open position when the pressure it shuts off exceeds the pressure from which it is shut off by a given value.

2. A vent valve including a valve seat surrounding an opening, and a valve structure mounted for relative movement as a whole toward and from said seat for closing on said seat including a cup-shaped cap having the inner diameter of its rim of substantially greater diameter than the outer diameter of said seat, a diaphragm of rubber-like material supported by said cap in an elastically stretched condition over the rim of said cap to maintain the portion of the diaphragm engaging the valve seat free from contact with the remaining portion of said cap under the fluid pressure conditions encountered, whereby the diaphragm conforms to the seat, the closing movement being arrested only by engagement of the free diaphragm portion on the valve seat, said diaphragm having a passage therethrough to provide communication between the seat opening and the interior of the cap to equalize pressure on opposite sides thereof, and said cap having a sealed engagement with said diaphragm to substantially prevent flow through said passage, except for equalization; the cap being floatingly positioned in its closed position and moved to the open position when the pressure it shuts off exceeds the pressure from which it is shut off by a given value.

3. A vent valve including a valve seat surrounding an opening, and a valve structure mounted for relative movement as a whole toward and from said seat for closing on said seat including a cup-shaped cap having the inner diameter of its rim of substantially greater diameter than the outer diameter of said seat, a diaphragm of rubber-like material supported by said cap in an elastically stretched condition over the rim of said cap to maintain the portion of the diaphragm engaging the valve seat free from contact with the remaining portion of said cap under the fluid pressure conditions encountered, whereby the diaphragm conforms to the seat, said diaphragm having an aperture therethrough to provide communication between said seat opening and the interior of said cap, the closing movement being arrested only by engagement of the free diaphragm portion on the valve seat, and means holding an intermediate part of the diaphragm substantially spaced from the plane of the seat-engaging portion of the diaphragm to present a conically-shaped surface to the seat; the cap being floatingly positioned in its closed position and moved to the open position when the pressure it shuts off exceeds the pressure from which it is shut off by a given value.

4. A vent valve including a valve seat surrounding an opening, and a valve structure mounted for relative movement as a whole toward and from said seat for closing on said seat including a cup-shaped cap having the inner diameter of its rim of substantially greater diameter than the outer diameter of said seat, a diaphragm of rubber-like material supported by said cap in an elastically stretched condition over the rim of said cap to maintain the portion of the diaphragm engaging the valve seat free from contact with the remaining portion of said cap under the fluid pressure conditions encountered, whereby the diaphragm conforms to the seat, said diaphragm having an aperture therethrough to provide communication between said seat opening and the interior of said cap, the closing movement being arrested only by engagement of the free diaphragm portion on the valve seat, and means holding an intermediate part of the diaphragm substantially spaced upwardly from the plane of the seat-engaging portion of the diaphragm to present a conically shaped surface to the seat; the cap being floatingly positioned in its closed position and moved to the open position when the pressure it shuts off exceeds the pressure from which it is shut off by a given value.

5. A vent valve including a valve seat surrounding an opening, and a valve structure mounted for relative movement as a whole toward and from said seat for closing on said seat including a cup-shaped cap having the inner diameter of its rim of substantially greater diameter than the outer diameter of said seat, a diaphragm of rubber-like material supported by said cap in an elastically stretched condition over the rim of said cap to maintain the portion of the diaphragm engaging the valve seat free from contact with the remaining portion of said cap under the fluid pressure conditions encountered, whereby the diaphragm conforms to the seat, said diaphragm having an aperture therethrough to provide communication between said seat opening and the interior of said cap, the closing movement being arrested only by engagement of the free diaphragm portion on the valve seat, the inside surface of the cap aligned with the seat being flat-ground to seat on the seat if the diaphragm is absent and close the valve; the cap being floatingly positioned in its closed position and moved to the open position when the pressure it shuts off exceeds the pressure from which it is shut off by a given value.

6. A vent valve for fuel storage tanks and the like, including a valve seat surrounding an opening, means for guiding a valve cap in a movement toward and from said seat, a cup-shaped valve cap guided by said means and having the inner diameter of its rim of substantially greater diameter than the outer diameter of said seat, having a rubber-like diaphragm elastically stretched over the rim of said cap and being free to move from a position in which said cap is supported solely by the stretched diaphragm on the seat to a position remote from said seat, the remaining portion of the cap, under the fluid pressure conditions encountered, being out of contact with the portion of the diaphragm resting on said seat, said diaphragm having an aperture therethrough to provide communication between said seat opening and the interior of said cap; the cap being floatingly positioned in its closed position and moved to the open position when the pressure it shuts off exceeds the pressure from which it is shut off by a given value.

7. A vent valve for fuel storage tanks and the like, including a valve seat surrounding an opening, means for guiding a valve cap in a movement toward and from said seat, a cup-shaped valve cap guided by said means and having the inner diameter of its rim of substantially greater diameter than the outer diameter of said seat, having a rubber-like diaphragm elastically stretched over the rim of said cap, and being free to move from a position in which said cap is supported solely by the stretched diaphragm on the seat to a position remote from said seat, the remaining portion of the cap, under the fluid pressure conditions encountered, being out of contact with the portion of the diaphragm resting on said seat, said diaphragm having an aperture therethrough to provide communication between said seat opening and the interior of said cap; and said diaphragm being freely stretched from a line surrounding and spaced from the seat to at least as far as one-third of the way across the opening; the cap being floatingly positioned in its closed position and moved to the open position when the pressure it shuts off exceeds the pressure from which it is shut off by a given value.

References Cited in the file of this patent

UNITED STATES PATENTS

| | | |
|---|---|---|
| 174,957 | Hill | Mar. 21, 1876 |
| 2,101,991 | Finley | Dec. 14, 1937 |
| 2,317,923 | Lebo | Apr. 27, 1943 |
| 2,388,395 | Duggan | Nov. 6, 1945 |

FOREIGN PATENTS

| | | |
|---|---|---|
| 12,334 | Great Britain | June 22, 1895 |